Oct. 23, 1934.  L. A. BECKER  1,977,713
AUTOMATIC MACHINE FOR INSERTING CIGARS OR THE LIKE IN CONTAINERS
Filed Aug. 2, 1930  10 Sheets-Sheet 1

INVENTOR
LOGAN A. BECKER

BY Ely & Barrow

ATTORNEYS

Oct. 23, 1934.  L. A. BECKER  1,977,713
AUTOMATIC MACHINE FOR INSERTING CIGARS OR THE LIKE IN CONTAINERS
Filed Aug. 2, 1930   10 Sheets-Sheet 3

INVENTOR
LOGAN A. BECKER

BY Ely & Barrow
ATTORNEYS

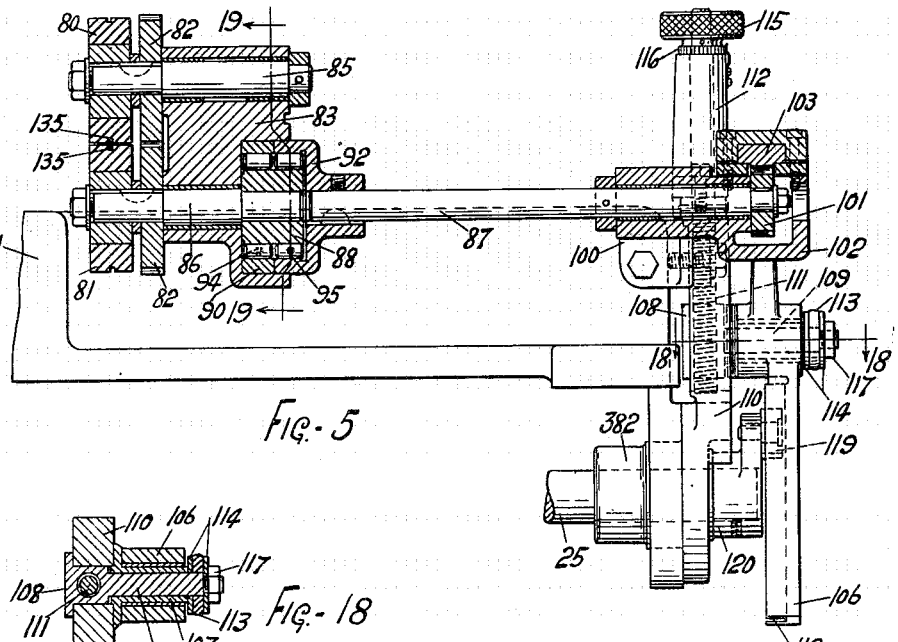
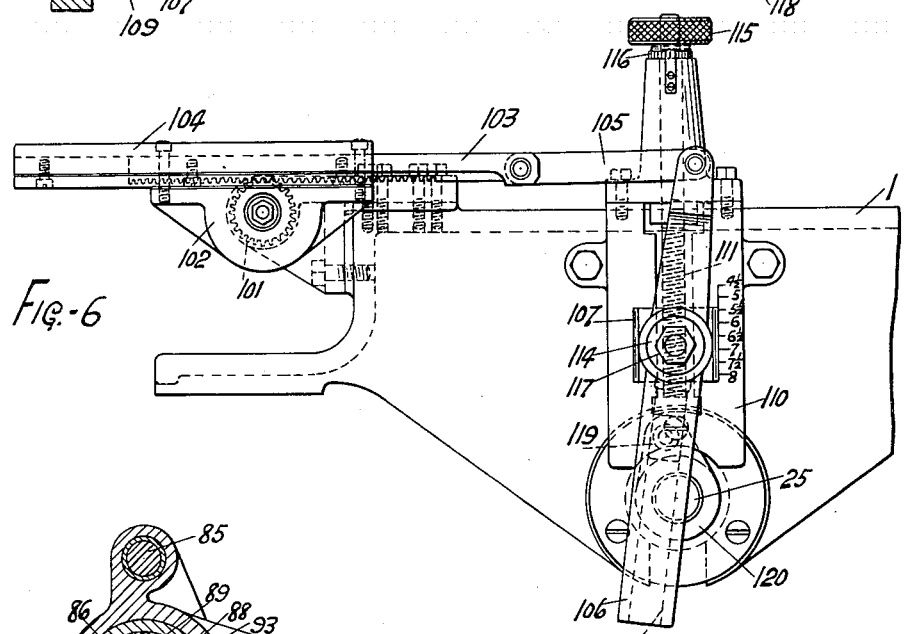
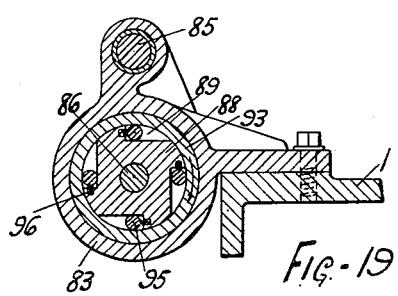

Oct. 23, 1934.  L. A. BECKER  1,977,713
AUTOMATIC MACHINE FOR INSERTING CIGARS OR THE LIKE IN CONTAINERS
Filed Aug. 2, 1930   10 Sheets-Sheet 6
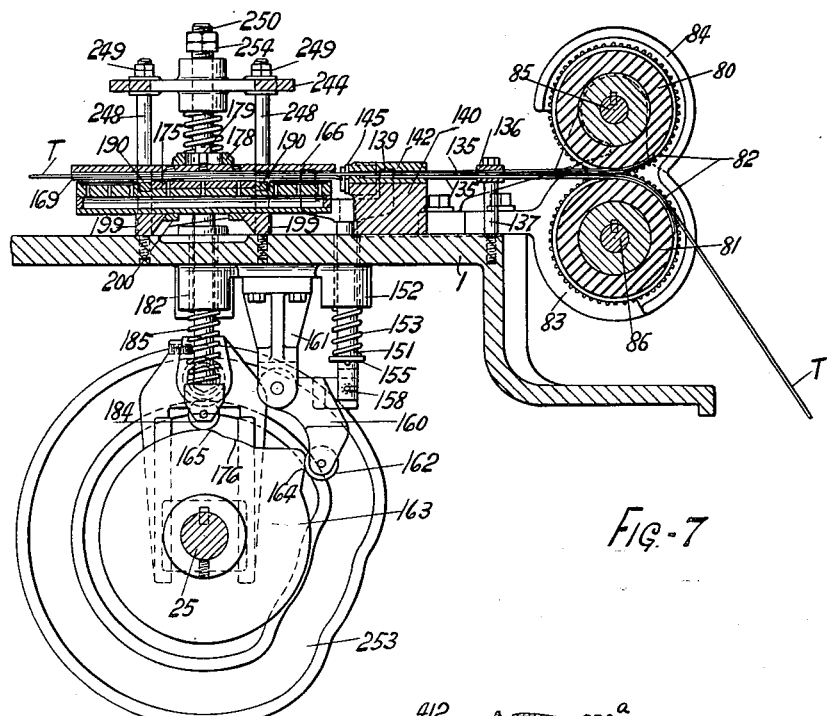
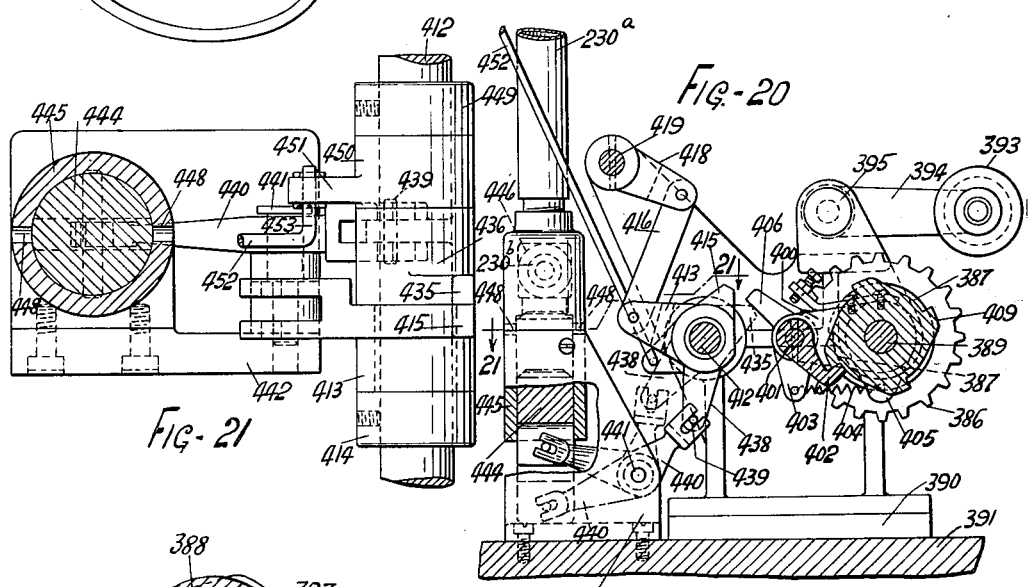
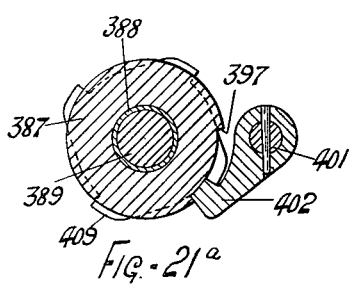
INVENTOR
LOGAN A. BECKER
BY Ely & Barrow
ATTORNEYS

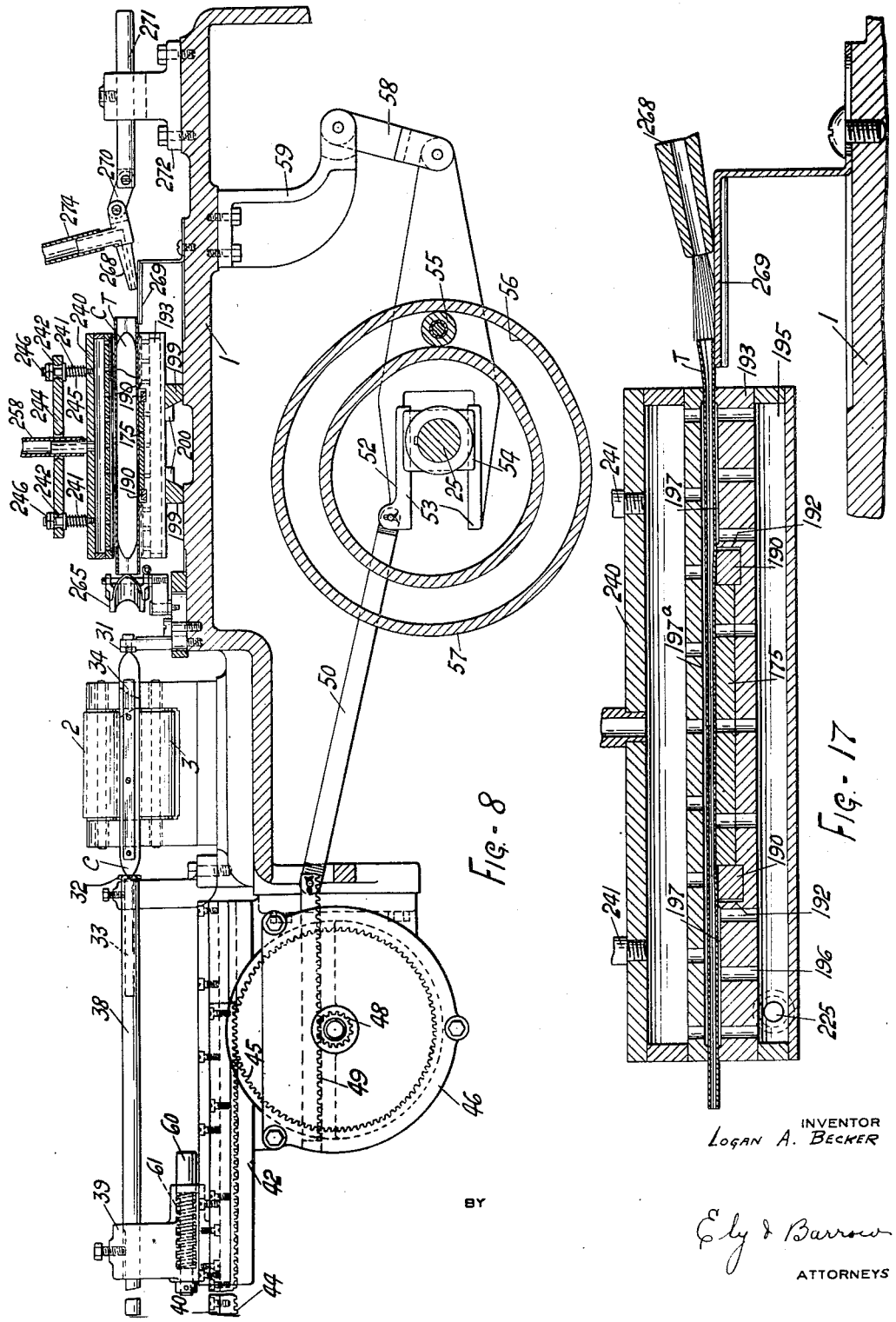

Oct. 23, 1934.  L. A. BECKER  1,977,713
AUTOMATIC MACHINE FOR INSERTING CIGARS OR THE LIKE IN CONTAINERS
Filed Aug. 2, 1930  10 Sheets-Sheet 8
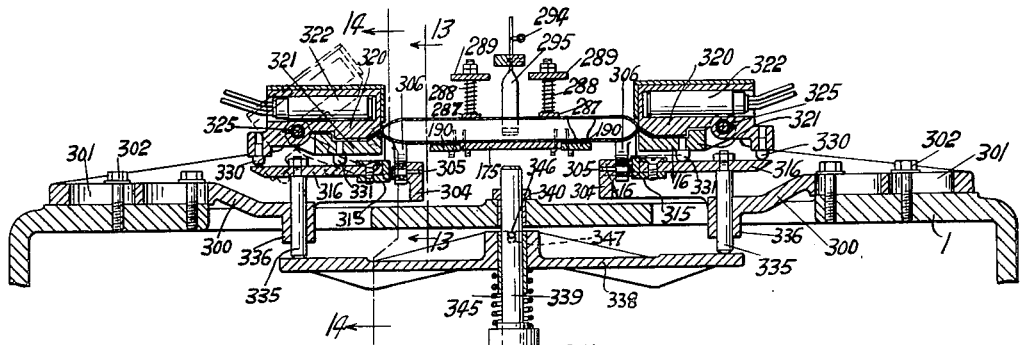
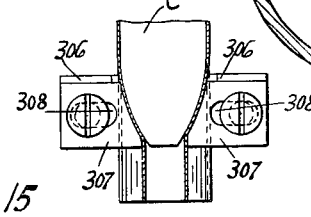
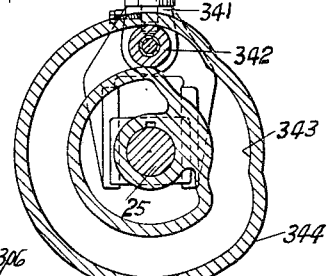
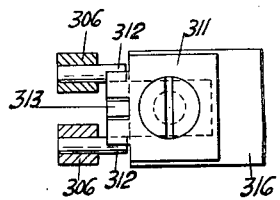
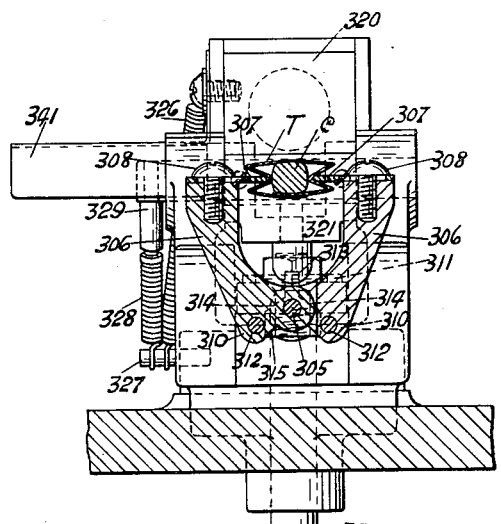
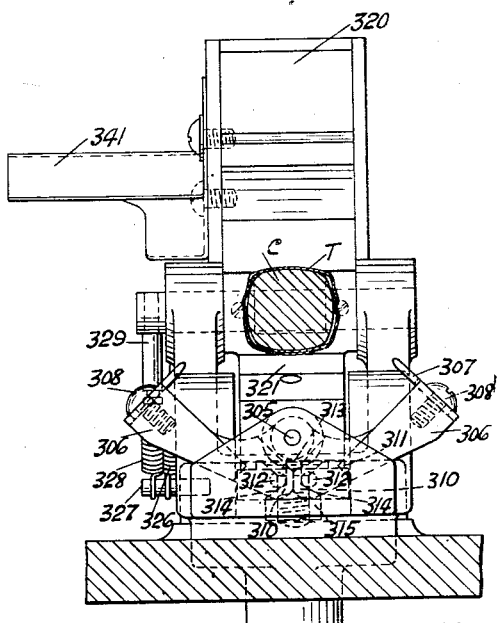
INVENTOR
LOGAN A. BECKER
BY
Ely & Barrow
ATTORNEYS Oct. 23, 1934.  L. A. BECKER  1,977,713
AUTOMATIC MACHINE FOR INSERTING CIGARS OR THE LIKE IN CONTAINERS
Filed Aug. 2, 1930  10 Sheets-Sheet 9

INVENTOR
Logan A. Becker
BY
Ely & Barrow
ATTORNEYS

Oct. 23, 1934.        L. A. BECKER        1,977,713
AUTOMATIC MACHINE FOR INSERTING CIGARS OR THE LIKE IN CONTAINERS
Filed Aug. 2, 1930        10 Sheets-Sheet 10

INVENTOR
LOGAN A. BECKER

BY
Ely & Barrow
ATTORNEYS

Patented Oct. 23, 1934

1,977,713

UNITED STATES PATENT OFFICE

1,977,713

AUTOMATIC MACHINE FOR INSERTING CIGARS OR THE LIKE IN CONTAINERS

Logan A. Becker, Lakewood, Ohio, assignor, by mesne assignments, to Du Pont Cellophane Company, Inc., New York, N. Y., a corporation of Delaware Application August 2, 1930, Serial No. 472,681

30 Claims. (Cl. 93—6)

This invention has for its object the construction of improved mechanism for the insertion of articles in containers. It is particularly designed for the loading of cigars in individual containers or wrappers, such as tubes or holders, although the general principles of the invention may be applied to other specific purposes. The invention has been illustrated and will be described as especially adapted for the handling and wrapping of cigars, but, as suggested and designed, it is broader in certain of its aspects.

The machine is especially constructed for the handling of tubes of thin, transparent, moisture-proof, regenerated cellulose, although other materials may be employed for the container or tube.

The machine shown herein is in the nature of an improvement upon the machine shown in prior application Serial No. 436,963, filed March 19, 1930.

The machine is not only adapted to place the cigars or other articles in the container, but is also designed to seal the ends of the container so that a sealed, air-tight package is obtained. In the handling of cigars, the machine is particularly effective and the product is not only attractive, but the air-tight sealing of the cigar preserves the original moisture content of the tobacco, so that the cigars remain fresh and do not deteriorate with age.

The finished product of the machine as shown comprises single or individual cigars in a sealed tubing, but the principles of the invention may be applied to a plurality of cigars in a single container.

The handling of the cigars by the machine and the insertion and sealing are entirely automatic. The materials operated upon present certain difficulties which it is the purpose of the invention to overcome. The machine as shown represents a simple, very efficient means of obtaining the results. The light, delicate wrapping material is handled without tearing and the sealing operation is performed efficiently.

The sheet cellulose, or similar material which constitutes the wrapper is usually coated with a light film of waterproofing composition which is fusible under heat, and the machine is designed to seal the containers by the application of heat and pressure to the end of the container so that the package is sealed air-tight.

One of the objects of the invention is to improve upon the sealing mechanism shown in the prior patent, whereby a shorter sealed end is provided, thus saving as much of the regenerated cellulose as is possible, and yet secure an effective seal at the end of the package.

Further objects of the invention are to improve the feeding means for feeding the stock more accurately, thus avoiding waste, and to provide automatic control means whereby the machine is stopped immediately in case the tube handling and opening mechanism should fail to function. This result not only saves the regenerated cellulose, but prevents injury to the cigars in the event of failure of the machine to open and present the tubes for filling.

Other objects of the invention are to improve upon the mechanism for inserting the cigar within the tube, and for making the machine more accessible so that the operator may correct and rectify any faulty operation of the machine. Other objects of the invention relate to improvements and betterments made in the design and operation of the machine so as to secure more accurate work than in the former machine.

In illustrating the invention, a practical operative embodiment has been shown and described, but it will be appreciated that the invention is not limited to exact conformity with the details as set forth, as improvements or modifications may be made thereon, all within the scope of the invention as set forth herein.

In the drawings:

Figure 5 is a vertical section on the line 5—5 of Figure 1, showing the stock or tubing feed device;

Figure 6 is an end elevation of the stock feeding mechanism;

Figure 7 is a vertical section on the line 7—7 in Figures 1 and 3 which is taken along the line of the stock feed;

Figure 8 is a vertical section on the lines 8—8 of Figures 1 and 3 at the cigar loading position;

Figure 9 is a vertical section on the line 9—9 of Figures 1 and 3 at the tucking and sealing position;

Figure 13 is a section on the line 13—13 of Figure 9 showing the tucking jaws open;

Figure 14 is a section on the line 14—14 of Figure 9 showing the tucking jaws closed;

Figure 15 is a detail plan view of the tucking jaws;

Figure 16 is an enlarged detail on the line 16—16 of Figure 9, showing the mechanism for operating the tucking jaws;

Figure 17 is a cross section through the tube holder and expanding heads;

Figure 18 is a detail section on the line 18—18 of Figure 5;

Figure 19 is a detail section on the line 19—19 of Figure 5;

Figure 20 is a detail section on the line 20—20 of Figure 4 showing the automatic control device;

Figure 21 is a section on the line 21—21 of Figure 20;

Figure 21a is a detail view of certain portions of the driving mechanism;

Figure 22 is a section showing the manner in which the tube is opened or spread;

Figure 24 is a cross section of the tube or stock;

Figure 1:
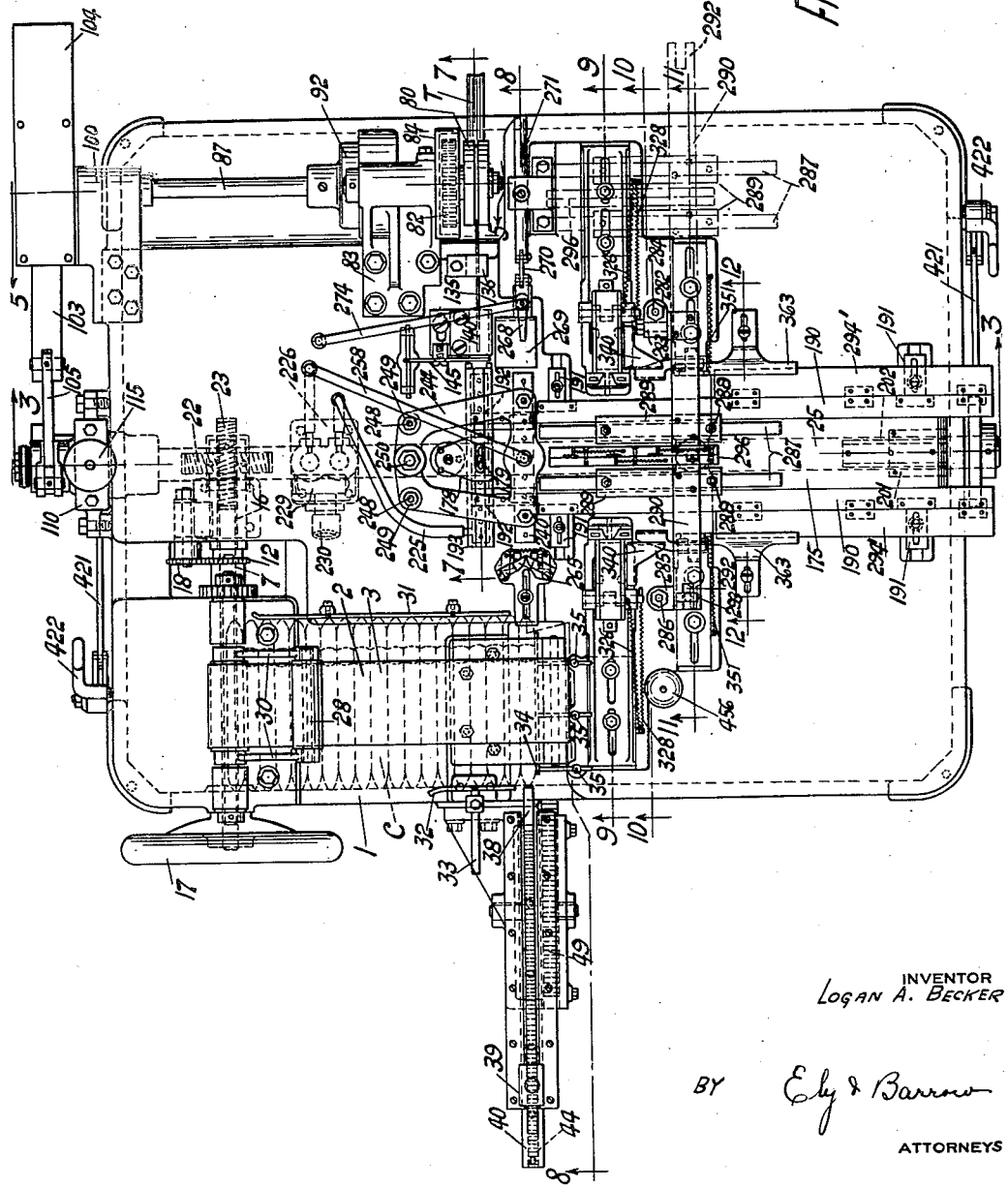
Figure 1 is a plan view of the complete machine.
Figure 2:
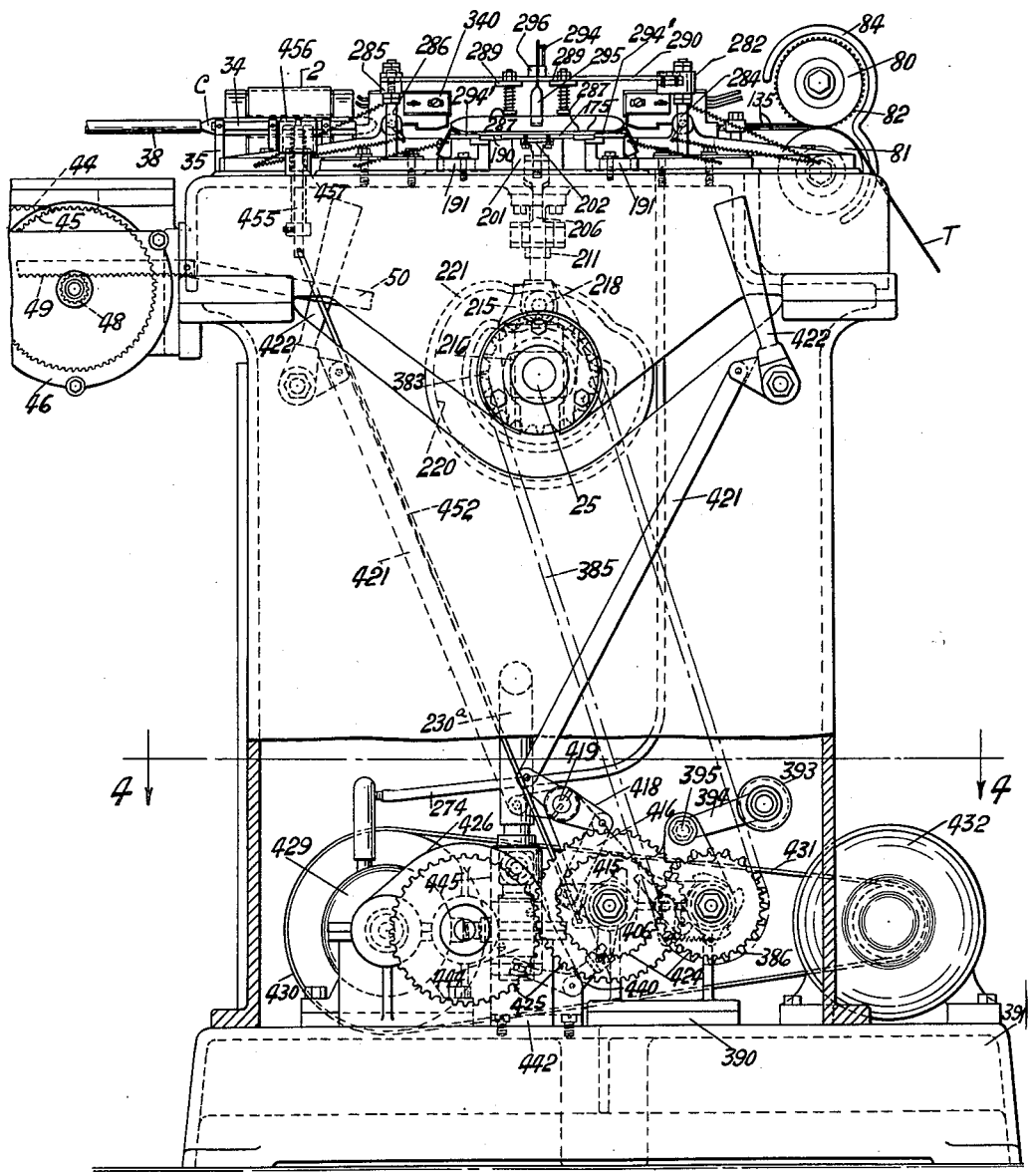
Figure 2 is an end view of the machine looking at that side of the machine at the bottom of Figure 1.

The machine is adapted and designed to operate upon a row or file of cigars as they issue from the finishing operations of cigar making, and may be adapted to receive a row of cigars as delivered by the banding machine, or to apply the tubes with the cigar bands printed thereon. The machine of this invention may be made to operate synchronously with the operation of the cigar banding machine, if such machine is to be used, so that the operations of the two machines may be performed economically and no handling of the cigars is required. The packaging operation is performed, therefore, without additional labor.

The machine is also designed to utilize material for the container or pouch which is made up in tubular form, and is usually furnished in a large roll or reel, the individual containers being cut off from the leading end of the roll by an automatic cutting device which measures and cuts off a single pouch or container. The stock from which the pouch is cut is preferably formed as a plicated tube with infolded or bellows-like sides and plane upper and lower panels.

The individual tubes are delivered to a transfer device by which they are moved to a position in alignment with the forward cigar as it is delivered to the machine and located in loading position. The pouch, which is open at both ends, is expanded so that it will receive the cigar and while held in expanded position by the operation of suction heads or expanders, the cigar is fed longitudinally into the tube.

After the cigar is loaded into the tube, the filled tube is advanced to another station where the projecting ends of the tube are tucked or folded inwardly along the lines of the bellows folds, and are then squeezed together with heat and pressure so as to fuse the waterproof coating whereby the adhesive seal is provided for the end of the tube. The heat not only seals the tube in the manner described but makes the normally stiff or rigid regenerated cellulose, limp and pliable so that the sealed end is turned down and caused either to adhere to the side of the tube, or to maintain a set in folded position. The folded end is then held during a succeeding station so that it will not tend to return to its normal outstanding position, and the wrapped and sealed cigars are in condition so that they may be easily inserted into the cigar box.

In order to describe the machine, the various stages of the operations will be treated separately, in so far as it is possible to do so.

*Cigar feeding mechanism*

The row or file of cigars C as they issue from the banding machine or are delivered by the cigar finisher, is received upon a plate 1, which is the bed plate of the machine, and thence between upper and lower belts 2 and 3 spaced at the required distance to engage and feed the cigars forwardly. At the point of admission of the cigars, the belts are trained over upper and lower pulleys connected by gearing so that the belts are driven at equal speeds from a shaft 7, which is extended and provided with a sprocket 12, driven by chain from a sprocket (not shown) on the shaft 16, which may be hand operated by the hand wheel 17. An adjustable idler 18 is provided for the chain. The shaft 16 is supported from the table and is driven by a spiral gear 22, meshing with a second spiral gear 23 on the main cam shaft 25.

The belt 2 is kept at the proper tension by an idler 28 resting upon the belt, being supported in swinging arms 30.

As the cigars are fed forward by the belts they are kept in alignment by a rail 31 at one side of the row or file. A second plate 32 mounted for adjustment upon a pin 33 is located near the discharge point for the cigars which are fed against an adjustable stop plate 34 supported upon posts 35 rising from the bed plate of the machine. The belts are preferably driven at greater speed than required to advance the cigar so as to insure that a cigar is located against the stop plate at all times.

The rails or guides 31 and 32 terminate short of the stop plate so as to permit the endwise transfer of the forward cigar, or cigars into the open tube. The transfer of the cigar is done by means of a movable plunger 38 which is adjustably mounted in a bracket 39 carried upon a slide 40 movable in guideways in a bracket 42 attached to the side of the machine. To the underside of the slide is secured a rack 44 which is engaged by a gear 45 supported in a housing 46 depending from the bracket. To the gear 45 is secured a small pinion 48 engaged by a reciprocating rack 49 mounted in a guideway in the housing and extending to and pivotally connected with a link 50, the opposite end of which is pivotally connected to a cross head 52.

This cross head is provided with parallel guides 53 which are reciprocable in ways in a collar 54 loosely mounted upon the cam shaft 25. On the cross head is supported a roller 55 which rides in a track 56 in the cam 57 secured to the cam shaft.

The cross head 52 is extended rearwardly and is supported by a link 58 pivoted on a bracket 59 depending from the bed plate of the machine.

In order to locate the cigars accurately within the tube, it has been found advisable to insure a positive limit of the forward movement of the plunger, and compensating for any lost motion in the gearing which might otherwise cause the movement of the cigar to varying points within the tube. This accuracy of location of the cigar is particularly desirable in the case of the shortened sealed end, the longer seal and fold such as secured in the former machine not requiring such accuracy of placement. For the purpose of the present case, the bracket 39 is equipped with a housing in which is located a plunger 60, pressed forwardly by the spring 61. As the bracket is moved inwardly upon the feeding stroke, the plunger 60, as it nears its furthermost limit of travel, strikes against a fixed part of the machine, in the present case against the side of the belt supporting bracket, and the resultant spring pressure causes the back lash in the gears to be taken up. The cigar feeding plunger will always stop at a definite point in its forward movement, thus insuring the accurate positioning of the cigar.

*Stock feeding and cutting mechanism*

The tubular stock for the containers or tubes T is furnished in rolls or reels, the material being supplied to the machine as a long tube having upper and lower panels 70 and 71, the latter being provided with the longitudinal seam 72. The bellows-like sides are indicated at 73. As the material is rolled up in the reels under considerable tension the stock is flattened out and is in the form of a thin, narrow ribbon.

The stock is fed from the roll intermittently and to the desired and proper length for a container for the cigars. In the form of the invention as illustrated a cigar of the large size is shown, and the machine is adjusted to cut the sections of the tube into sizes to accommodate such cigars, and the remaining parts of the machine are correspondingly shown. The mechanism for feeding and cutting the stock will now be described.

On entering the machine the stock T passes to upper and lower feed rolls which grip the stock and advance it intermittently the required length.

The upper feed roll is indicated by the numeral 80, and the lower feed roll by the numeral 81. These rolls, which may be faced with rubber or cork, are geared together at synchronous speed by the intermeshing gearing 82, and are supported upon a bracket 83 attached to the upper surface of the bed plate. The gearing is surrounded by a housing 84, and the upper roll is mounted upon an idler shaft 85. The lower roll is carried upon a shaft 86, which is in alignment with the oscillatory shaft 87, driven from mechanism to be described, so that definite and fixed lengths of the tubular stock are advanced. It is necessary that the feeding mechanism be accurate at all times, and that there be no backward movement of the feeding rolls upon the cessation of the forward feeding movement. For this purpose the clutch mechanism between the shafts 86 and 87 is used, which will now be described.

The shaft 86 extends beyond the bracket 83, and carries a fixed sleeve 88, having a plurality (shown as four) of angular pockets 89 formed in the periphery thereof. Press-fitted within the housing and surrounding the sleeve 88 is a collar 90, which is preferably half the depth of the sleeve, and secured to the end of the shaft 87 is a cup 92, the flange 93 of which is complementary to the collar 89, and surrounds the sleeve 88. Associated with the collar 90 and with the flange 93, are two sets of rollers 94 and 95, respectively, and in the pockets are sets of springs 96, which force the rollers into the narrow bights formed by the pockets. When the shaft 87 is moved forwardly in the direction of the arrow (Fig. 19), the rollers 95 will be pinched within the pockets and lock the shafts 86 and 87 together for the feeding stroke. In the same manner the rollers 94 will lock the shaft 86 with the collar 90 to prevent reverse movement of the shaft 86, at the end of the feeding stroke, and the shaft 87, will rotate reversely without moving the shaft 86.

The shaft 87 is journalled in a bracket 100, mounted upon the bed plate of the machine, the rear end of the shaft being provided with a pinion 101, mounted in a housing 102 on the bracket, having a slideway 104 secured to the upper surface thereof. Movable longitudinally in the slideway 104 is the horizontal rack 103, which is connected by link 105 with an arm 106, pivotally mounted upon a sleeve 107, the latter having a limited movement along the extension 109 of a nut 108. The nut 108 is slidably mounted in a guideway formed in a bracket 110, attached to the frame of the machine. A block of rubber 113, located between washers 114 on the end of the extension and confined by a nut 117, exerts pressure upon the end of the sleeve so as to hold the sleeve firmly against the face of the bracket 110. This construction maintains the block 110 and the nut in adjusted position and prevents the nut from creeping during the operation of the machine. It is vertically adjusted by means of a screw 111, having an extension received in a sleeve 112, attached to the upper side of the bracket. A knurled operating knob 115 is provided on the end of the extension, and the screw is locked by the toothed disk and pawl 116. The lower end of the arm 106 extends downward past the end of the main cam shaft 25, where it is provided with the groove or slot 118, in which is received the shoe 119 on a crank 120 secured to the end of the cam shaft. It will be observed that as the pivot point of the arm 106 is raised or lowered with respect to the cam shaft, the effective stroke of the arm, and the feeding movement imparted to the rollers 80 and 81 will be decreased or increased. This gives a very simple method of varying or adjusting the feeding stroke, and one which can be controlled during the operation of the machine, it being necessary only to rotate the knob 115 in one direction or the other to vary the stroke of the feeding device.

Returning now to the point of delivery of the stock, it will be observed that the surfaces of the feed rollers are grooved and in the grooves are located the upper and lower guiding wires 135 which are attached to a plate 136 carried upon a post 137 adjacent the delivery point of the feed rolls. The wires are located at the upper and lower sides of a slot or passageway in the plate and extend at one side of the plate into the grooves in the upper and lower feed rolls respectively, being curved around the surfaces of the rolls. At their opposite ends the wires extend into and are slidable in a slot or passageway in an adjustable block 140, the forward end of the block having a plate 142 against which the end of the tube is cut off. The wires serve to guide the stock or tube in its passage from the feed rolls to the point where it is cut off and prevent the stock from adhering to the rolls. The adjustment of the block permits different lengths of tube to be cut off in a central position with respect to the center line of the machine.

When the stock is fed forwardly a length projects beyond the block 140 which is cut off by a knife 145 movable over the mouth of the passage 139. This knife is pivoted on the block and is operated by a vertical plunger 151 slidable in a bearing sleeve 152 on the bed plate 1. A light coil spring 153 surrounds the lower end of the plunger between the sleeve and a washer 155 on the plunger. The lower end of the plunger is provided with a cross pin 158 movable in a rocking cam lever 160, pivotally mounted in a bracket 161 depending from the bed plate. The end of the lever 160 has thereon a roller 162 which is actuated by a cam 163 on the shaft 25, the cam being provided with an abrupt formation 164 which causes the quick actuation of the knife to sever the leading end of the tube T.

In alignment with the passage 139 is an elongated cross head 166 having a channel in its lower face adapted to receive the end of the tube T as it is moved outwardly by the feed rolls. On opposite sides of the channel are thin metal plates or shims 169 which support the end of the tube, or the detached container, but permit it to be withdrawn by the agencies to be described.

Beneath the cross head is located a transfer plate 175, the details of which will be described in the next succeeding portion of the specification, this plate being provided with suction means at its inner end to seize the severed length of tubing and remove it from the channel. It is necessary to raise and lower the cross head to effect the transfer.

This last operation is performed by the cam 163 which acts upon the cross head or tube carrier just after the operation of the knife. It will be observed in Figure 7 that there is a slight depression 176 in the face of the cam just forwardly of the formation 164. This depression is negligible as far as the operation of the knife is concerned, but it serves to lower the cross head and carrier momentarily to bring the severed tube in position to be removed by the suction in the face of the transfer plate, and then the formation 165 raises the cross head so that the tube is removed from the channel, whereupon the carrier is restricted to alignment with the passage 139. This action is obtained by supporting the cross head upon a plate 178, through an adjustable connection 179. The plate 178 is vertically adjustable on the reduced stem 180 of a vertically movable rod 181, feathered in a sleeve 182 set in the bed plate. The lower end of the rod 181 carries a roller 184 which rests upon the surface of the cam 163, a coil spring 185 pressing the roller downwardly.

*Tube transfer, cigar inserting and indexing mechanisms*

The transfer or indexing plate 175 which has been previously referred to, is an elongated horizontal slide which extends from the point of delivery of the severed tube to the discharge point for the loaded tube. It is also an indexing plate which advances the container past the several stations from the application of the tube or container through the folding and sealing operations.

The slide or indexing plate is reciprocated between two fixed stationary side plates 190 which parallel the indexing plate to the point of discharge of the loaded container. The side plates are fixed to the bed plate of the machine by adjustable brackets 191, and the rear ends are reduced and receivable in recesses 192 in a cross head 193 when the latter moves forwardly as will be described.

The inner or rear end of the indexing plate carries the cross head or suction head 193 which is transverse to the indexing plate and attached thereto at its midway point as at 194. The suction head is recessed at its point of attachment to the indexing plate so that its major surface is flush therewith. The cross head is provided with a longitudinal passage 195 from which extends a plurality of small openings 196. These passages extend into the surface of the indexing plate, but at the end portions of the head they open into channels 197 in the face of the head, and closed at their ends. This formation, in conjunction with a similar formation on an upper head, securely holds the tube when the heads are brought together.

The indexing plate is supported at its inner end through the medium of the cross head which rests upon ways 199 on the bed plate, which are provided with undercut surfaces with which are engaged gibs 200 attached to the suction head. The forward end of the plate 175 is supported upon a block 201 on the bed plate, a gib or key 202 engaging therewith.

The reciprocating movement is imparted to the plate 175 by means of rocking lever 205 pivoted on a bracket 206 depending from the bed plate, one end of the lever having a pin and slot connection 208 with a lug 209 depending from the plate, while the opposite end has a similar connection 210 with a lug 211 attached to a vertical rod 212. The rod 212 slides at its upper end in a sleeve 214 located in the bed plate, the opposite end of the rod being received in the upper end of a fork 215, the arms of which embrace a slide block 216 on the cam shaft 25. A roller 218 is secured to the fork and engages a cam groove 220 in the surface of the cam 221.

Returning to the suction head, it will be observed that suction is intermittently exerted upon the head and thus to the face of the head and slide by a flexible connection 225 which extends to a control head or valve 226 attached to the bed plate wherein is located a plunger 227 having a passage 228 therein, which establishes a communication at the required times with a transverse passage 229 from which extends a trunk 230 to a source of vacuum. The plunger 227 is provided with a roller 231 which rests upon the cam 232 secured to a collar 233 on the cam shaft. The upper portion of the plunger is hollow, and receives a spring 235 which forces the plunger downwardly. When the high portion of the cam 232 is active the passage 228 is brought into alignment with the ports 225 and 229 to seize and hold the tube, but when the tube is to be released the roller rides upon the lower portion of the cam bringing the port 225 into alignment with a vent. The latter operation, which relieves the suction at the head, occurs at the termination of the loading operation when the filled container is to be moved forwardly for the sealing operation.

After the tube is removed from the carrier or channel 166 and held upon the lower suction head 193, the indexing plate moves forwardly to bring the tube into a position beneath an upper suction head 240 and there is a dwell after the forward movement, caused by the configuration of the cam 221 during which time the tube is opened and the cigar inserted. The opening of the tube is performed by lowering the head 240 which exerts suction on the upper panel of the tube, and in conjunction with the head 193 spreads the tube to receive the cigar, the suction being maintained until the loaded container is moved forward to the next station. The head 240 is similar to the head 193, except that the suction openings are in the under surface thereof, and the channel 197ª extends across the head as shown in Figure 17. This head is carried upon two pins 241 slidably received in openings 242 located in a horizontal frame 244, springs 245 yieldingly pressing the head downwardly against the nuts 246, and accommodating the machine to variations in thicknesses of cigars of the same nominal size.

The frame 244 is mounted for vertical reciprocation on pins 248 secured in the bed plate at the rear of the cross head having adjusting nuts 249 on the upper end thereof. An actuating rod 250 is passed through and slidable in the frame 244 and extends through a sleeve 251 in the bed plate to a fork 252 similar in construction to the fork 215 previously described. The rod 250 is actuated periodically by the cam 253, so that the upper suction head is lowered at the proper intervals by means of the adjusting nuts 254 at the top of the rod. A spring 255 on the rod 250 serves to elevate the frame sufficiently upon the upward movement of the rod to spread the tube properly. The nuts 254 are for the purpose of moving the upper and lower heads together to the proper distance, while the nuts 249 in conjunction with spring 255 raise the upper head to the proper distance from the lower head to spread the tube to the required extent.

The cross head 240 is connected by a flexible tubing 258 to the valve housing 226 where a plunger 260 similar to the plunger 227 controls the vacuum to the face of the upper cross head. This valve is controlled by the cam plate 262 carried on the collar 233, the release of suction to the upper cross head occurring simultaneously with the release of suction to the lower suction head. The lower portion of the cam 262 extends beyond the lower portion of the cam 232, so that suction is not again exerted upon the upper suction head until the tube is in position beneath it.

It is desirable to provide a snug fit for the cigars in the tube for the sake of giving the best appearance to the package. It is also necessary to guide the cigars accurately into the mouth of the tube to prevent the catching of the band on the edge of the container, and to spread the mouth thereof to permit the easy entrance of the cigars. Before the cigar is entered into the tube the latter will assume the position shown in dotted lines in Figure 22, and it is necessary to start the cigar properly in the tube. For the purposes set forth, a spreader or funnel 265 is provided, which is moved into the mouth of the tube, and as the cigar is advanced into the tube by the plunger 38, it opens the tube for the purposes set forth. This spreader or funnel is fully described in the copending application referred to, and reference is made to that application for a detailed description of its combination and operation.

It is advisable to assist the opening of the tube by the suction heads, and for this purpose a jet of air is directed against the end of the tube upon the side of the machine opposite the loading or cigar inserting mechanism, the air serving to spread apart slightly the two panels and permitting the entry of air therein. The device for this purpose consists of a nozzle 268 which rests upon a bracket or shelf 269 opposite and in line with the cigar feeding plunger. As the end of the tube is carried over the shelf, it is subjected to the blast of air and opened slightly, as shown in Figure 17, to accomplish the results. The nozzle 268 is supported by a link 270 on the end of an adjustable rod 271 carried in the bracket 272 on the bed plate. A flexible hose 274 is connected to the nozzle and conducts the air under pressure from the air delivery side of the suction pump which supplies the reduced pressure for the tube handling and opening devices.

After the cigar has been fed into the tube and properly located as shown in Figure 8, the suction in the upper and lower heads is released, and the indexing plate moves back to take another tube, and the loaded container is ready to be moved forwardly for the succeeding operations. In order to prevent the loaded container from being moved backwardly by the indexing plate, fingers 278 are attached to the rear face of the upper suction head and extend downwardly sufficiently to act as a stop for the loaded container.

Figure 3:
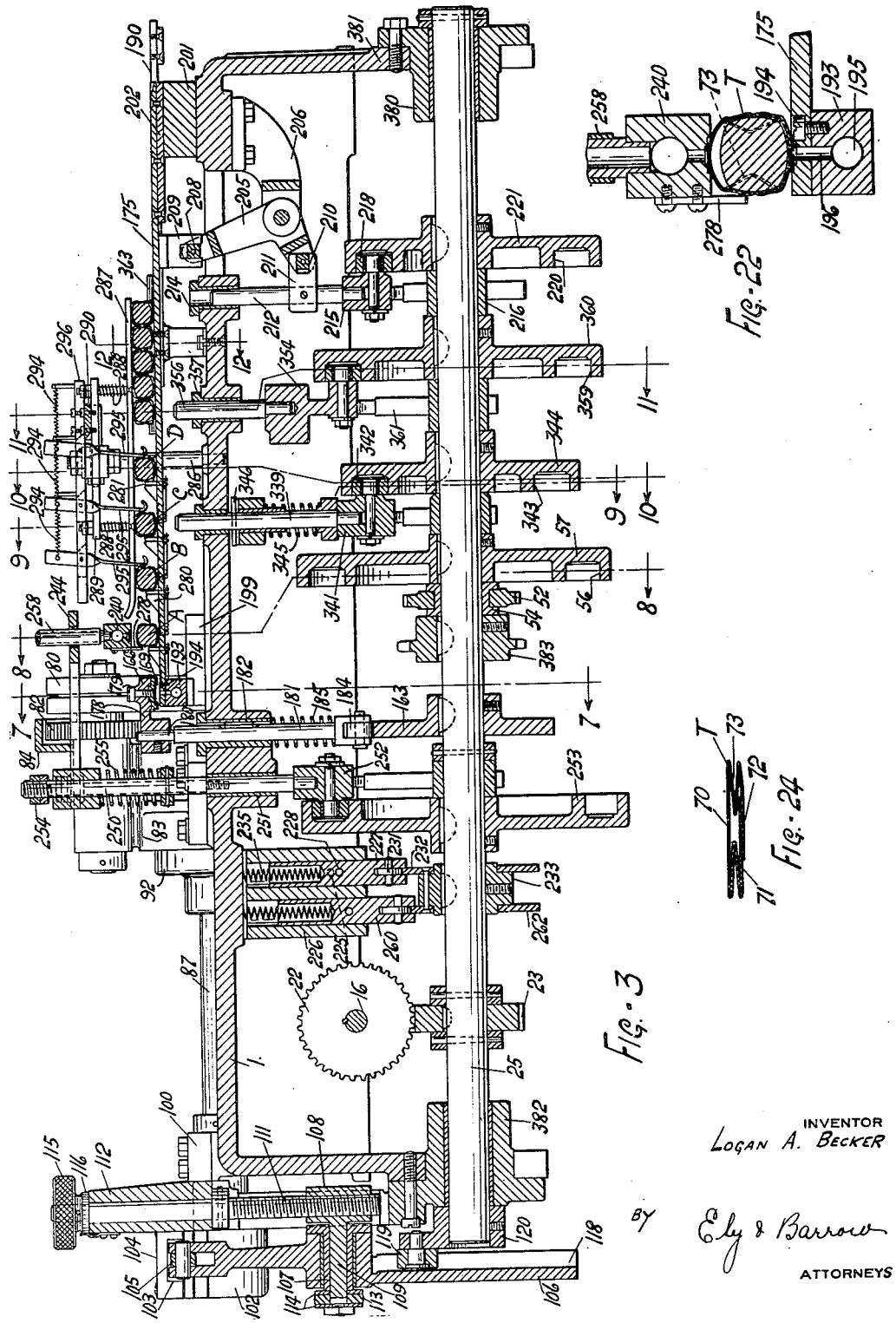
Figure 3 is a longitudinal vertical section along the main or cam shaft, the location of the view being indicated by the line 3—3 of Figure 1.
Figure 4:
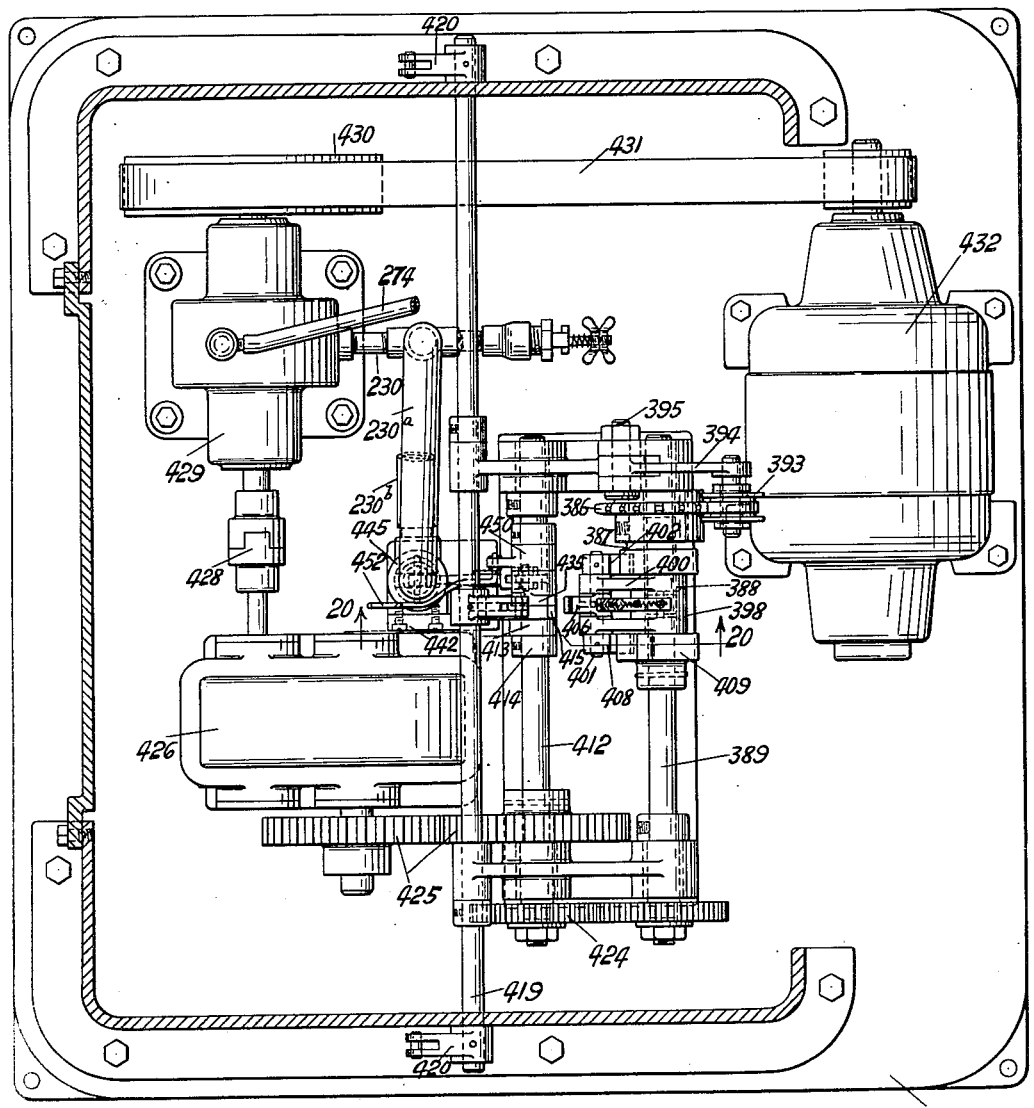
Figure 4 is a horizontal section on the line 4—4 of Figure 2, showing the various driving elements.

The forward feeding, which is performed step by step, is accomplished by means of sets of pivoted dogs 280 on the indexing plate 175, and corresponding sets of dogs 281 on the stationary plates 190, the construction being the same as shown in the prior copending application to which reference is made, it being sufficient to state here that the cigars are moved step by step through the several positions as shown in Figure 3, by the cooperation of these dogs, until they are delivered at the finish of the several operations in the row or file ready for packing.

To insure the exact positioning of the loaded containers in their proper positions along the plate, there are provided spaced pivoted fingers 295, depending from a bar 296 attached to the cross plate 290. These fingers extend downwardly so as to contact the central portion of the loaded container, yielding slightly with the forward movement thereof so as to retain the containers against the faces of the fixed dogs 281. When the containers are fed forwardly, the light springs 294 secured to the upper ends of the fingers will yield to permit the passage thereof.

In order to retain the loaded containers upon the plates, spring held parallel shoes 287 are provided, these shoes being supported upon spring held yielding pins 288 supported upon rails 289 attached to cross plate 290. The elevation of the plate 290 is adjustable to accommodate variations in the thickness of cigars.

It is desirable to have the cigars which are being carried along upon the indexing and feeding mechanism, accessible readily, and for this purpose the plate 290, together with the spring fingers and shoes carried thereby, are movable away from the runway along which the cigars are traveling. At one end the plate 290 is carried upon a lug 282, which is pivoted in a sleeve 283 adjustably mounted upon the upper end of a post 284 rising from the bed plate. The opposite end of the plate 290 lies upon the vertically adjustable rest 285, carried upon the pin 286 rising from the bed plate. The end of the cross plate is provided with a fork 292 in which is received the locking turn button 293. When it is desired to get at the cigars on the runway or feeding mechanism, the locking button is turned and the entire assembly over the cigars may be raised.

Beyond the ends of the shoes the stationary side plates 190 are provided with wings 294' to retain the folded ends of the container in position.

Sealing mechanism

As the loaded container is moved forwardly in the manner described and located by the fixed dogs 281, the successive sealing operations are performed. As viewed in Figure 3, the loaded container occupies four positions during the loading and sealing operations, these positions being indicated by the letters A to D inclusive. The station A is the loading station, the operations at that point having been described. The station B is an idle station at which no operations are performed.

At the station C the ends of the container which project beyond the end of the cigar are sealed by the application of heat and pressure which fuses the waterproof coating upon the regenerated cellulose sheet, and causes the end thereof to be sealed. At the same time, the heat used in the sealing of the container, renders the springy material soft and pliable so that the sealed end can be folded beneath the container, and in the subsequent cooling will set in this folded position so that in placing the cigars in boxes the ends of the container do not project outwardly, but are folded under the cigars. It is also necessary to tuck in the sides of the container so that flaring of the ends thereof will be prevented, and the sealed package will present nicely squared ends which fill the box, but do not overlap one another. In the former machine wherein the larger ends were provided upon the container, the projecting ends would of themselves break into the bellowslike folds beyond the cigar, and no means was necessary to assist in the reforming of these ends. With the shorter sealed end, however, which this machine is adapted to form, the ends of the tube or container, and particularly that end which has been spread by the funnel 265, may not always break into the inwardly tucked folds, and it is advisable therefore to assist the folding or tucking operation by the provision of tuckers, which are brought against the projecting ends of the container and start the folds properly.

It will also be noted that the heat sealers which apply the heat and pressure to the ends of the container operate upon the end while it is projecting outwardly from the cigars. To obtain the subsequent wiping or folding over of the sealed end, it is immediately turned over under the container while still warm, and thus acquires a set in the folded over position. This action may also result in the sticking of the end against the side of the container, but this is not essential as the end will acquire the set in folded position, and will not interfere with the subsequent box loading operations, even if it is not stuck to the side of the container.

The tuckers and heat sealers are located at the station C, and are duplicated on either side of the machine.

As the loaded container comes to rest at this station the ends thereof are projecting outwardly as shown in Figure 8, the bellows folds 73 being in the sides thereof. Beneath the end of the container and secured to the bed plate 1 is the tucker and sealer carrying bracket 300, having aligned slots 301, through which project the bolts 302 which secure the bracket in adjusted position relative to the center line of the machine, whereby the device may be located properly to accommodate varying lengths of cigars. The forward or inner end of the bracket is forked and closed by the transverse web 304 in which is mounted the bearing pin 305 on which are pivoted the two opposing tucker arms 306, carrying at their outer ends the tucker blades 307. These blades are adjustably secured to the ends of the arms, as shown at 308, and are curved or shaped on their opposing edges so as to conform somewhat to the shape of the end of the cigar. The tucker arms normally drop down out of the path of the container and remain open in the position shown in Figure 13, being supported in that position by the contact of the lower or tail ends 310 thereof. In the tail ends of the tucker arms are located the projecting pins 312 which normally rest upon the inclined surfaces 314 and against a central tongue 313, formed in the projecting end of a block 315, which is attached to the under side of a heat sealer operating plate 316. A plate 311 is secured to the end of plate 316 and is adapted to strike the pins 312 to insure the separation of the tucker arms. The tongue 313 serves to maintain the tucker arms in central position when at rest.

In the operation of the machine, the plate 316 is raised to perform the operation of heat sealing the end of the container, and in so rising the surfaces 314, through the pins 312, move the tucker arms upwardly and inwardly so that the blades 307 will start the folds in the manner shown in Figure 14, and due to the mechanism shown, this tucking operation will take place just prior to the heat sealing. As the tucker plates are located with their inner ends at or close to the end of the cigars, they do not interfere with the subsequent heat sealing. The pins 312 may ride over the vertical parallel sides of the block 315 so as to hold the tucks in position during the heat sealing.

The heat sealers consist of a pair of upper and lower pivoted jaws 320 and 321, respectively, the upper jaw being provided with an electrical heating element 322. The opposing faces of the jaws are designed to grip the tucked projecting end of the container as shown in Figure 9, to seal the same with the combined heat and pressure, fusing the waterproof coating. In order to assist in the subsequent folding under operation, the faces of the jaws may be inclined downwardly slightly as shown, although this is not essential.

The jaws 320 and 321 are mounted upon the common pivot pin 325, located in the bracket 300, to which pin the jaw 321 is fastened. The jaws when in repose, are kept open as shown in dotted lines in Figure 9 by means of a coil spring 326 attached to the jaw 320 and a pin 327 on the frame, and a second coil spring 328 attached to the pin 327 and a pin 329 on the shaft 325.

To bring the jaws together, the tail end of the jaw 320 is provided with a bearing pin 330, and the jaw 321 with a second bearing pin 331 which rest upon the plate 316, previously described. The plate is shown in Figure 9 in raised position, but when it is lowered the jaws will open by the spring tension and gravity to assume the dotted line position out of the path of the filled container.

To operate the plate 316, it is provided with a guiding pin 335 located in a sleeve 336 on the bracket 300, the same projecting through an opening in the bed plate of the machine. The two pins 335 rest upon a cross arm 338 which extends beneath the pins upon opposite sides of the machine and is slidably mounted upon a vertically movable rod 339, slidable at its upper end in a sleeve 340 set in the bed plate, and attached at its lower end to a fork 341 similar in construction to the fork 215. A roller 342 is carried upon the fork 341, and rides in a groove 343 on the cam 344 on the cam shaft 25. The cross arm 338 is supported upon a spring 345 surrounding the rod above the fork, and is guided by a pin 346 extending through the rod and engaging grooves or notches 347 in the cross arm.

As the cam approaches its upper limit of movement, the cross arm is raised through the spring, which at the upper limit of movement is compressed through the contact of the cross arm with the pins 335, and through the meeting of the jaws on the projecting ends of the pouch, thus the ends of the pouch are heated and pressed together for the heat sealing.

The jaws not only press the end of the tube together, but form a transverse crease at the tip of the cigar, so as to assist in the subsequent folding under operation.

Figure 10:
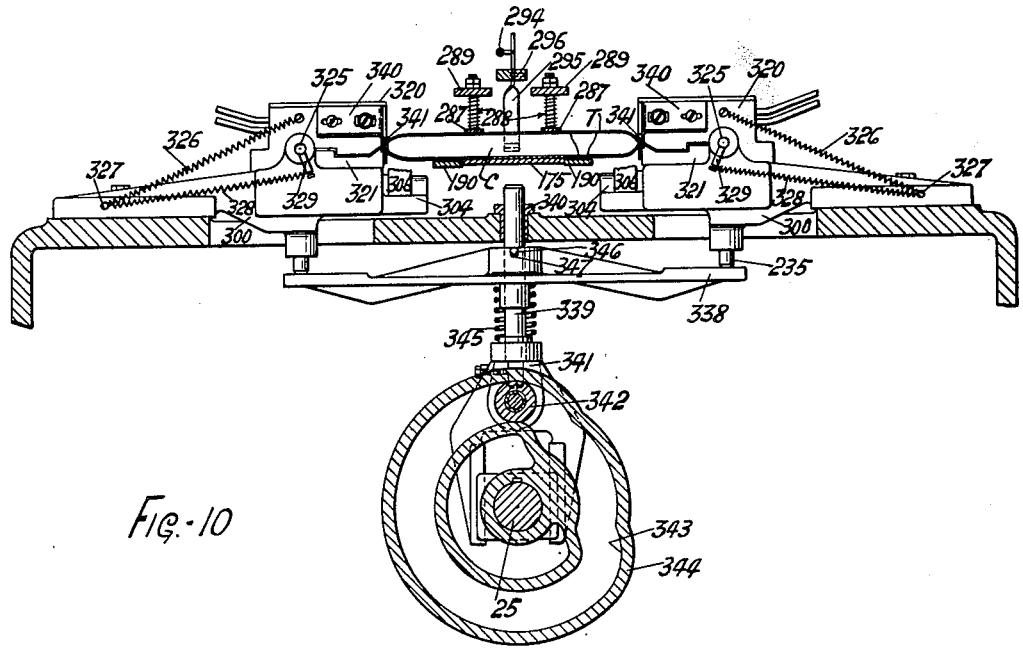
Figure 10 is a side view of the parts shown in Figure 9, the section whereof is indicated at 10—10 in Figures 1 and 3.
Figure 11:
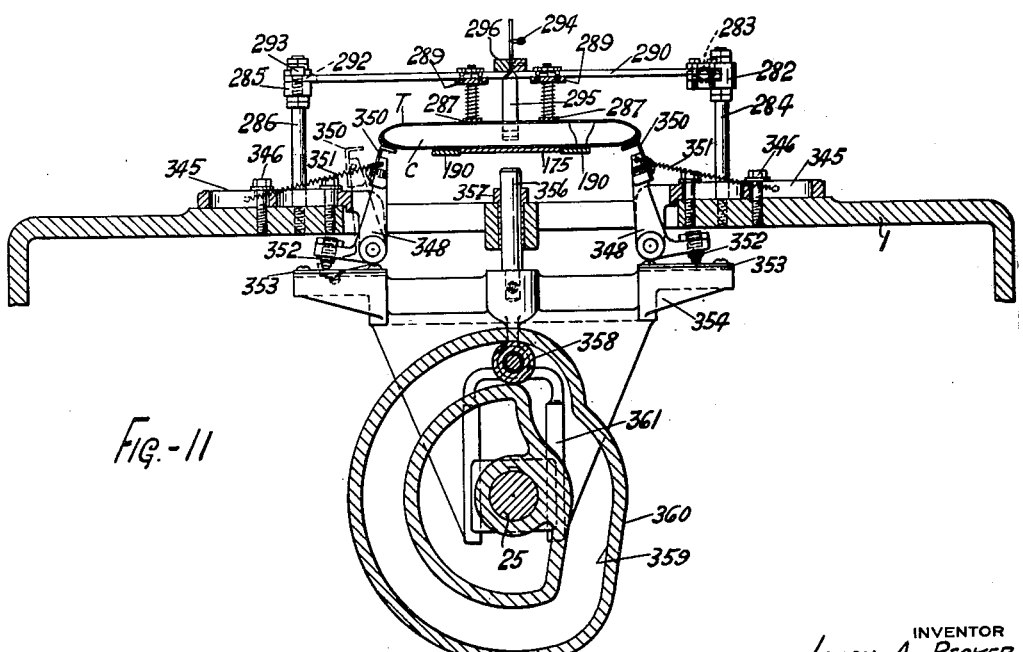
Figures 11 is a view showing the operation of the wiping operation, taken on the line 11—11 of Figures 1 and 3.

The next operation, which is performed at the station D, is the folding or wiping operation which bends the heated and sealed ends of the tube downwardly before they have had an opportunity to cool, this operation being shown in Figures 10 and 11. This operation is performed by two instrumentalities, working in closely timed relation, which first bring the heated sealed end in approximately vertical position, and then wipe it under the end of the container. To the side of the upper sealing jaw is adjustably attached the angular wiper plate 340, which extends along the path of the loaded container, and at the station D is provided with a vertical blade 341, which, as the upper sealing jaw is lowered, wipes down the sealed end of the container in the position shown in Figure 10.

Immediately after the operation of the wiping blade 341, the turned down end of the container is further wiped beneath the end of the cigar, this operation being shown in Figure 11. At either side of the loaded container at station D are located the adjustable brackets 345, secured to the bed plate by the bolts 346. Each of these brackets is provided at its inner end with a downturned extension projecting through an opening in the bed plate on which is pivotally mounted the angular arm 348, the vertical portion of which is provided with the adjustable angular wiper shoe 350, which, in its movement from dotted line position to full line position in Figure 11, completes the wiping operation pressing the heated sealed end against the side of the container. The arm 348 is normally held away from the loaded container by the coil spring 351 attached to the end of the arm and to the bracket 345. The arm is actuated through the adjustable bearing pin 352 in the lower end thereof, which rests upon a bearing plate 353 on the end of the cross arm 354, which extends beneath both of the wiper devices. The arm 354 is guided in its vertical movement by a pin 356 operating in a sleeve 357 in the bed plate, and is supported by a roller 358 riding in the cam groove 359 on the cam 360 located in the cam shaft. A fork 361 guides the cross arm in its movement.

Figure 23:
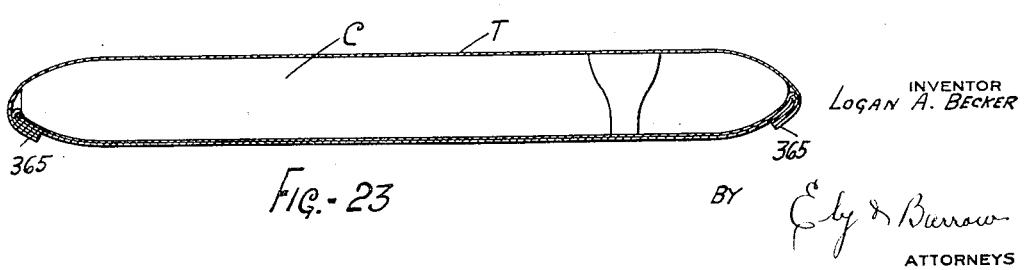
Figure 23 is a detail view of the wrapped cigar.
Figure 12:
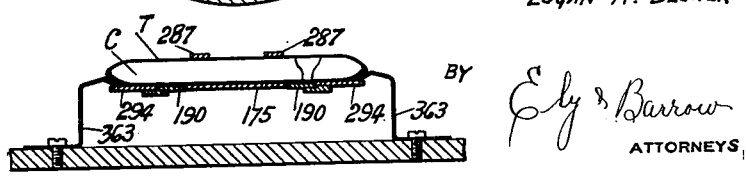
Figure 12 is a vertical section on the line 12—12 of Figures 1 and 3 showing the final wiping operation.

It is advisable to maintain the end of the container in its wiped down position to enable it to chill or set effectively, and for this reason as the container is moved from the position D, the end thereof is advanced over a stationary plow-share or curved plate 363 (Figure 12), which is adjustably secured to the bed plate, and projects over the wings 294 for a sufficient distance to deliver the sealed containers in their final cooled and set condition in substantially the form shown in Figure 23, the tucked, sealed and wiped closures for the ends of the containers being indicated at 365. The file of completed containers passes out beneath the shoes, and is ready for the packing operation.

*Driving mechanism*

The main driving element of the machine is the cam shaft 25 which is supported at the forward or delivery end of the machine in bearing 380, located in a bracket 381, and at the rear end of the machine in a bearing 382. It is driven by a sprocket 383, located centrally of the shaft, and connected by chain 385 with a sprocket 386 secured to a drum 387 rotatable upon a sleeve 388 on a horizontal jack shaft 389, located in bearings on a plate 390 carried upon the base 391 of the machine. An idler roll 393 bears against the chain, being supported upon a floating lever 394 pivoted on the pin 395.

The drum 387 is extended at one side of the sprocket 386 and enlarged, being provided with an elongated notch 397. On the end of the sleeve 388 adjacent the drum is an enlarged barrel or cylinder 398, from which extend the two parallel arms 400, in the ends of which is mounted the pin 401, the ends of which extend beyond the arms on either side. On one end of the pin is fixed the pawl 402 which is adapted to engage the notch 397 in the drum. Midway of the arms is located a trigger 403, to one side of which is attached a spring 404, connected to a lug 405 on the barrel 398, so that the trigger is normally held in the position shown in Figure 20. The opposite end of the trigger is extended as at 406 in the path of operating mechanism for releasing the drive from the power as will be explained.

The other end of the pin 401 carries a second pawl 408, which is adapted to engage for driving purposes one of the teeth on a ratchet 409, pinned to the jack shaft 389. It will be observed that when the parts are as shown in Figures 20 and 21a, the jack shaft and the sprocket wheel drum are connected together for rotation by the parts 409, 408, 401 and 402, and that the barrel 398 which carries the pin 401 and its connected elements is rotating with the shaft 389.

The mechanism just described is employed to insure that when the machine is stopped the parts will be in a certain position, and particularly that the hot sealing jaws will be lowered away from the container so as to avoid burning the container or injuring the cigar, which is when the pawl 402 is disengaged. When the driving mechanism is thus disengaged, the machine can be turned by hand.

Mounted on the plate 390 at the side of the jack shaft 389 is a shaft 412 on which is rotatably mounted a sleeve 413 against a collar 414. This sleeve is formed with a lug 415 which is somewhat less in extent than the finger 406, and is movable by the rocking of the sleeve into the path of the trigger finger 406. When moved over to intercepting position, the trigger will raise the finger and release the pawls 402 and 408 and lock the barrel in that position, the notch 397 being of sufficient length to permit re-engagement of the pawl 402 and the drive at whatever relative position the ratchet and pawl 408 and 409 may be located when the machine is again to be operated. It will be noted that the teeth 409 project slightly beyond the periphery of the drum 387, so that, if the machine has been operated by hand during the time the drive is disconnected the pawl 408 will always be engaged by one of the teeth 409 at any position of the drum 387 upon resuming the machine operation.

The sleeve 413 is connected by a link 416 with a lever 418 fixed to an operating shaft 419 extending through the machine and connected to lever arms 420 at either side thereof. A link 421 is connected to each arm 420, extends to and is connected with an operating handle 422 at either side of the machine frame so that the machine may be stopped and started by an operator in either position.

The machine is driven by the shaft 389 as described through gearing 424 from the shaft 412 which is connected by gearing 425 to a reduction gear unit 426. The reduction gearing derives its power through a flexible coupling 428 from the shaft of the pump 429, the intake end of which is connected by the pipe 230 to the suction heads through the valve mechanism as described. The shaft of the pump 429 carries a pulley 430 connected by the belt 431 to the motor 432. From the discharge side of the pump is connected the pipe 274 which leads to the air blast.

In case the suction heads fail to seize and hold a tube or container, as may happen, the machine will cease to function properly and the wastage of tubes and injury of cigars will result. It has, therefore, been found advisable to provide means whereby, should either of the suction heads fail to operate, the machine will be stopped instantly and will remain inactive until reset by the operator. The mechanism by which this desirable result is accomplished will now be described, it being noted that the safety device thus provided is operated automatically by the loss of suction which will occur if the suction heads do not properly seize the tube or if the tube is lost or misplaced with respect to the suction heads. It will be appreciated that the valves 227 and 260 will only be open when a tube is to be engaged, but that if these valves are open and the suction heads are not closed by the presence of the tube the suction will be lost, and it is this reaction which is depended upon for the operation of the safety device.

The mechanism which is designed to stop the machine in the event of loss of suction when a tube should be in position, operates in conjunction with and supplementing the manual control device which has just been described. The lug 415 was described as somewhat less in extent than the finger 406. Alongside of the lug 415, and in the path of movement of the finger 406, is located a second or companion lug 435, formed on the sleeve 436, rotatable on the shaft 412. This sleeve is provided with an arm 438 in which is located a pin 439, engaging slots in the forked end of a lever 440, pivoted at 441 in a bracket 442, attached to the base 391. The opposite side of the lever 440 is provided with a pin and slot connection with a weighted valve member 444, which is slidable in a valve housing or cylinder 445 on the base of the machine.

The valve housing is interposed in the line 230 from the pump to the suction valves, a branch 230a leading from the pump to a chamber 446 in the housing, and a second branch 230b leading to the passage 229 in the valve housing 226. It will be seen that during the time when the suction is maintained in the line 230 the plunger or valve 444 will be elevated as shown in full lines in Figure 20, and the lug 435 will be in inoperative position. Should the suction or partial vacuum be lost, the plunger will drop of its own weight, and will move the tooth 435 into position to strike the trigger 406 and stop the machine.

It is advisable to provide manual means to reset the parts and start the machine in operation, not relying upon the re-establishment of suction, which may occur at an inconvenient or dangerous time. For this reason the cylinder 445 is provided with openings 448 above the top of the plunger, when in lowermost position. When the machine is to resume operation, the plunger is lifted manually by the following means. On the shaft 412, and confined by the collar 449, is the loose sleeve 450, having an arm 451 to which is connected the curved end of a rod or lever 452, the horizontal portion 453 of which is located over the lever 438. The rod 452 is extended to the bed plate of the machine, where it is pivotally connected to a rod 455 extending through the table, and having a push button 456 on its upper end. A spring 457 maintains the push button in elevated position. When the machine is stopped by the loss of suction and the operator desires to resume operations, he presses upon the button 456 and the lower end of the rod 452 engaging the lever 438 will move the lug 435 out of the path of the trigger finger, and will elevate the plunger 444 past the openings 448, whereupon the machine will start in motion. This device affords an additional safety device for the machine, and prevents untimely resumption of the operation thereof, even if suction be re-established.

*General description of the operation*

It is believed that a brief résumé of the operation of the machine will be sufficient as the parts and their functions were fully described during the main portion of the description.

The cigars are fed forwardly by the belts into the path of the feeding plunger 38. The ribbon of tubing is fed to the required extent by the feed rolls 80 and 81, and is cut off by the knife at the intervals between the stock feeding strokes. The lengths of tubing are supported in the carrier 166 until removed by the lower suction head. The tube is then carried forward by the advance of the lower suction head, and spread by the lowering and raising of the upper suction head. The cigar is now fed into the spread tubing through the expansible funnel 265, the correct positioning of the cigar being assured by the plunger 60.

The loaded container is now advanced to the tucking and sealing station, Figure 9, where the ends of the container are tucked in and sealed. At the next station the ends are turned down by the wipers, and folded under the containers. The loaded containers are now advanced through the last steps of the machine which serve to iron the sealed end in place. The cigars are fed forwardly by the indexing plate, and held in position by the stationary dogs 281 and the pressure rails or shoes 287.

The machine is readily adjustable and adaptable for the range of cigars normally found, and different shapes will be effectively loaded, appropriate changes in the tucker blades and in the wipers 350 being made to suit the work in hand. In the case of a blunt end cigar the edge of the wiper blade may strike the folded end of the container. The machine is automatic and will load cigars at a high rate of speed with no injury to the cigars and without damaging the containers, the automatic stop device insuring the cessation of the machine should a tube be lost or misplaced. Variations in sizes of cigars of a given run are provided for, and the machine is so designed and constructed that the delicate wrappers or containers are handled without injury and without spreading the longitudinal seam therein, and the machine is adapted for requisite variations in the cross section of the tube.

Banded cigars are introduced into the containers easily, and without injury to band or containers. The sealed ends are securely and hermetically held together by the fused coating.

The machine effects considerable economy in providing a short sealed end for the container. It also presents considerable economy in that the stock is delivered to the machine in roll form, and the machine makes its own pouch and inserts the cigar therein, sealing it at both ends.

*Modified form of tucking and sealing means*

Figure 25:
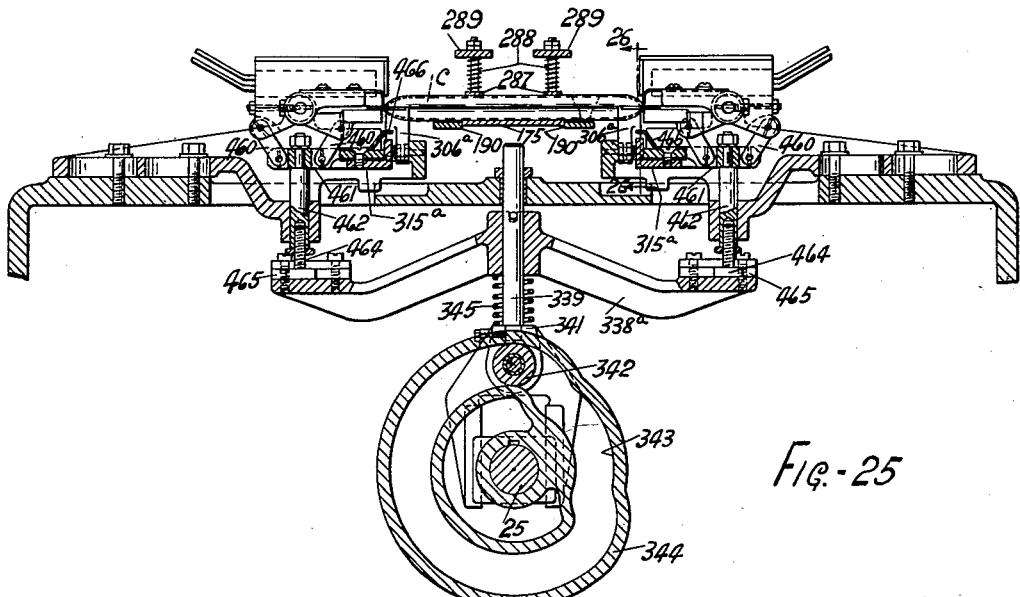
Figure 25 is a side elevation similar to Figure 10 showing a modified device for operating the tuckers.
Figure 27:
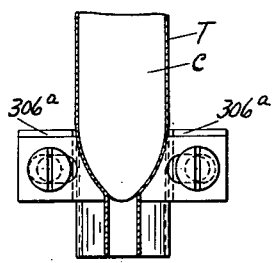
Figure 27 is a section on the line 27—27 of Figure 26.
Figure 26:
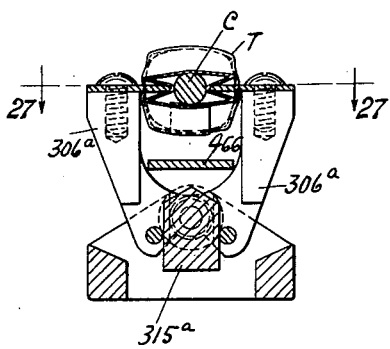
Figure 26 is an enlarged section on the line 26—26 of Figure 25.

In the form shown in Figures 25 to 27 inclusive, the sealing jaws are formed with horizontal operating faces, and are connected by links 460 with the operating plate 461, which is carried upon a pin 462. The pin is connected to the arm 338a by the adjustable headed bolt 464, which fits in a slot 465 in the end of the arm 338a. This tends to give a more positive action to the sealing jaws than can be obtained by the use of springs as described in the main portion of the specification.

The tucker arms 306a are operated by the somewhat differently shaped block 315a, and are positively separated by a finger 466 attached to the plate 461 and projecting between the arms. The finger 466 operates to separate the tucker arms in a more positive manner, and also maintains the tucker arms in central position when at rest.

The purpose of the modified form of the tucker operating mechanism is to provide a more positive and exact form of machine, and when the machine is operated at high speed is preferable to the type of tucker operating mechanism described in the body of the specification.

The invention shown and described herein is a marked improvement over similar forms of machine, and secures new and beneficial results. The claims are entitled to a broad scope and are not necessarily limited to the exact form of machine shown and described. Changes, modifications and improvements may be made within the broader principles of the invention as set forth.

What is claimed is:

1. A machine for loading articles in tubular containers, the combination with means for feeding a length of tubular stock in collapsed condition and severing a tube from the leading end thereof, means for expanding said collapsed tube, a loading device for inserting an article in the tube, means for sealing the end of the tube while projecting laterally, and means for turning the projecting sealed end beneath the loaded tube.

2. A machine for loading articles in tubular containers having a fusible waterproof coating thereon, means for feeding a length of tubular stock in collapsed condition and severing a tube from the leading end thereof, means for expanding said collapsed tube, a loading device for inserting an article in the tube, and means for applying heat and pressure to the end of the tube projecting laterally beyond the article.

3. A machine for loading articles in tubular containers having a fusible waterproof coating thereon, means for feeding a length of tubular stock in collapsed condition and severing a tube from the leading end thereof, means for expanding said collapsed tube, a loading device for inserting an article in the tube, means for applying heat and pressure to the end of the tube projecting laterally beyond the article, wiping the sealed end beneath the tube, and holding the same in that position during the cooling thereof.

4. A machine for loading articles in tubular containers having a fusible waterproof coating thereon, means for feeding a length of tubular stock in collapsed condition and severing a tube from the leading end thereof, means for expanding said collapsed tube, a loading device for inserting an article in the tube, means for applying heat and pressure to the end of the tube projecting laterally beyond the article, and means for wiping the sealed end beneath the tube while the stock is heated, and holding the same in that position during the cooling thereof.

5. In a machine for loading articles in tubular containers of regenerated cellulose sheeting, comprising means for feeding a container in collapsed condition and means for spreading the same, a device for inserting an article therein, and means for applying heat and pressure to an end of the container while projecting laterally therefrom to close the same.

6. In a machine for loading articles in tubular containers of regenerated cellulose sheeting having a fusible waterproof coating thereon, comprising means for feeding a container in collapsed condition and means for spreading the same, a device for inserting an article therein, and means for applying heat and pressure to an end of the container to fuse the coating and form a seal on the container while projecting laterally therefrom.

7. In a machine for loading articles in tubular containers of regenerated cellulose sheeting having a fusible waterproof coating thereon, tuckers located and movable only within the length of the cigar and adapted to form longitudinal bellows folds in a projecting end of the container, means for applying heat and pressure to seal the end of the container, and a common actuator for the said tuckers and the said sealing means whereby the tuckers form the bellows folds prior to the action of the sealing means and positively maintain said bellows folds during the action of the sealing means.

8. In a machine for loading articles in tubular containers of regenerated cellulose sheeting having a fusible waterproof coating thereon, tuckers located and movable only within the length of the cigar and adapted to form longitudinal bellows folds in a projecting end of the container and for applying heat and pressure to seal the end of the container while projecting laterally of the container, a common actuator for the said tuckers and the said sealing means whereby the tuckers form the bellows folds prior to the action of the sealing means and positively maintain said bellows folds during the action of the sealing means, and means to wipe the end of the container beneath the body thereof.

9. In a machine for loading articles in tubular containers of regenerated cellulose sheeting having a fusible waterproof coating thereon, a device located and movable only within the length of the cigar and to tuck an end of the container inwardly to form a plurality of overlapping plies therein, means for applying heat and pressure to the end of the container as it projects laterally, a common actuator for the said tucking device and the means for applying heat and pressure whereby the tucking device forms the overlapping plies in an end of the container prior to the action of the means for applying heat and pressure and positively maintains said plies during said action, and means for wiping over the sealed end before it cools.

10. In a machine for loading articles in tubular containers of regenerated cellulose sheeting having a fusible waterproof coating thereon, a device located and movable only within the length of the cigar and to tuck an end of the container inwardly to form a plurality of overlapping plies therein, means for applying heat and pressure to the end of the container as it projects laterally, a common actuator for the said tucking device and the means for applying heat and pressure whereby the tucking device forms the overlapping plies in an end of the container prior to the action of the means for applying heat and pressure and positively maintains said plies during said action, and means for wiping over the sealed end before it cools and for holding it beneath the body of the container.

11. In a machine for sealing the end of a tubular container for cigars or the like, a pair of movable tuckers having blades located and movable only within the length of the cigar and shaped to fit the sides of the cigar adjacent the end thereof and adapted to form bellows folds in the end of the container, members to apply heat and pressure to the folded end of the container, means to move the members upon the end of the container projecting beyond the cigar, a common actuator for the said tuckers and the said heat and pressure applying members whereby the tuckers form the bellows folds in the end of the container prior to the action of said members and positively maintain said bellows folds during the action of said members on the end of the container, and a wiper for turning the sealed end of the container toward the body thereof.

12. In a machine for the uses and purposes set forth, means for holding a loaded tubular container with the end projecting beyond the article therein, a pair of pivoted arms having blades thereon adapted to move against the sides of the container, and a pair of movable jaws to press the end of the container together, and a common actuator for the arms and the jaws adapted to bring the blades against the sides of the container prior to the operation of the jaws.

13. In a machine for loading cigars in pouches, suction heads to hold the pouches, driving mechanism to actuate the machine, a source of partial vacuum, a conduit leading therefrom to the heads, a clutch in the driving mechanism, a tumbler normally elevated by the suction within the conduit but operable upon the release thereof to operate the clutch.

14. In a machine for holding and spreading tubes, a suction head adapted to hold a side of the tube, a pump, a conduit leading from the head to the pump, driving mechanism for the machine, a clutch in said driving mechanism, and clutch actuating means held in inactive position by the reduced pressure within the conduit.

15. In a machine for holding and spreading tubes, a suction head adapted to hold a side of the tube, means for inserting an article in the tube while so held, actuating mechanism for said means, a clutch in said actuating mechanism, and a clutch operating device responsive to the suction and held in inoperative position through unbalanced atmospheric pressure.

16. In a machine for holding and spreading tubes, a suction head adapted to hold a side of the tube, means for inserting an article in the tube while so held, actuating mechanism for said means, a stop mechanism for said actuating mechanism, and a control device for said stop mechanism held in inoperative position by the suction on the head.

17. In a machine for holding and spreading tubes, a suction head adapted to hold a side of the tube, means for inserting an article in the tube while so held, actuating mechanism for said means, a stop mechanism for said actuating mechanism, a control device for said stop mechanism held in inoperative position by the suction on the head, and a manually actuated means for resetting the control device.

18. In a machine for holding and spreading tubes, a suction head to hold a side of the tube, a pump, a conduit leading from the intake side of the pump to the head, a valve in said conduit, and a trip mechanism also located in the conduit, and actuated to stop the machine when both the valve and the face of the suction head are open.

19. In a machine for holding and spreading tubes, means for feeding cigars or the like into the tube, a suction head to hold a side of the tube, a pump, a conduit leading from the intake side of the pump to the head, a valve in said conduit and a trip mechanism also located in the conduit, and actuated to stop the machine when both the valve and the face of the suction head are open.

20. In a device for loading cigars or the like into tubes, a device for holding a tube in spread condition, means to insert an article in the tube, comprising a plunger movable axially of the tube, a gear and rack for operating the plunger, and means for taking up any slack in the plunger operating device.

21. In a device for loading cigars or the like into tubes, a device for holding a tube in spread condition, means to insert an article in the tube, comprising a plunger movable axially of the tube, a gear and rack for operating the plunger, and means for taking up any slack in the plunger operating device, said means comprising a spring operated s op carried by the plunger and movable in contact with a fixed part of the machine as the plunger approaches the end of its feeding stroke.

22. In a machine of the character described, a feeding and indexing conveyor adapted to advance a plurality of containers to different stations, a pressure device above the conveyor, and means to mount the pressure device so that it may be swung away from the conveyor.

23. In a machine of the character described, a feeding and indexing conveyor adapted to advance a plurality of containers to different stations, a pressure device above the conveyor, spring operated locating fingers on the pressure device, and means to mount the pressure device so that it may be swung away from the conveyor.

24. In a machine for sealing the end of a tubular wrapper for cigars or the like, a pair of movable tuckers having blades located and movable only within the length of the cigar and shaped to fit the sides of the cigar adjacent an end thereof and adapted to form bellows folds in the end of the wrapper, jaws to apply heat and pressure to the folded end of the wrapper, means to close the jaws upon the end of the wrapper projecting beyond the cigar to seal said end, and common actuating means for the said tuckers and the said sealing jaws whereby the tuckers form bellows folds in an end of the wrapper prior to the action of the jaws and positively maintain said bellows folds during the sealing action.

25. In a machine for sealing the end of a tubular wrapper for cigars or the like, a tucking device having blades located and movable only within the length of the cigar and shaped to fit the sides of the cigar adjacent an end thereof and adapted to initiate bellows folds in the end of the wrapper, members to apply heat and pressure to the folded end of the wrapper, means to move the members upon the end of the wrapper projecting beyond the cigar to seal said end, and common actuating means for the said tucking device and the said sealing members whereby the tucking device forms the bellows folds in an end of the wrapper prior to the action of the sealing members and positively maintains the said bellows folds during the sealing action.

26. In a machine for sealing the end of a tubular wrapper for cigars or the like, a tucking device having blades located and movable only within the length of the cigar and shaped to fit the sides of the cigar adjacent an end thereof and adapted to initiate bellows folds in the end of the wrapper, members to apply heat and pressure to the folded end of the wrapper, means to move the members upon the end of the wrapper projecting beyond the cigar to seal said end, common actuating means for the said tucking device and the said sealing members whereby the tucking device forms the bellows folds in an end of the wrapper prior to the action of the sealing members and positively maintains the said bellows folds during the sealing action, and a wiper for turning the sealed end of the wrapper toward the body thereof.

27. In a machine for the uses and purposes set forth, means for holding a tubular wrapper having a cigar therein, a pair of blades located and movable only within the length of the cigar and shaped to fit against the sides of the cigar adjacent an end thereof and movable against the wrapper, a heated member movable against the end of the wrapper projecting beyond the end of the cigar, a member movable against the end of the wrapper in cooperation with the said heated member, and a common actuator for the said pair of blades and the said members whereby the blades move against the wrapper prior to the movement of the members against the end of the wrapper and remain there during the action of the said members.

28. In a machine for the uses and purposes set forth, means for holding a tubular wrapper having a cigar therein, a pair of blades located and movable only within the length of the cigar and shaped to fit against the sides of the cigar adjacent an end thereof to form bellows-like folds in the wrapper, a heated jaw movable against the end of the wrapper beyond the end of the cigar, a second jaw movable against the end of the wrapper in cooperation with the heated jaw, and a common actuator for the said pair of blades and the said jaws whereby the blades form the bellows folds prior to the action of the jaws and positively maintain the said bellows folds during the action of the jaws.

29. In a machine for the uses and purposes set forth, means for holding a tubular wrapper having a cigar therein, a pair of blades located and movable only within the length of the cigar and shaped to fit the sides of the cigar adjacent an end thereof to initiate bellows-like folds in the wrapper, a heated jaw movable against the end of the wrapper, a second jaw movable against the end of the wrapper in cooperation with the heated jaw, a common actuator for the said pair of blades and the said jaws whereby the blades form the bellows folds prior to the action of the jaws and positively maintain the said bellows folds during the action of the jaws, and means to bend the end of the wrapper while warm toward a side thereof.

30. In a machine for loading cigars or the like into plicated tubular containers having infolded or bellows-like sides and plane upper and lower panels, a tucking device having blades located and movable only within the length of the cigar and shaped to fit the sides of a cigar adjacent an end thereof and adapted to contact with the bellows-like sides of the container to initiate the formation of bellows folds in the end of the container projecting beyond the cigar, means to apply heat and pressure to said projecting end of said container, and common actuating means for said tucking device and said members to apply heat and pressure whereby the tucking device forms the bellows folds prior to the action of said members and positively maintains the said bellows folds during the action of the said members.

LOGAN A. BECKER.